United States Patent [19]
Yang et al.

[11] Patent Number: 5,847,798
[45] Date of Patent: Dec. 8, 1998

[54] POLYMER STABILIZED BLACK-WHITE CHOLESTERIC REFLECTIVE DISPLAY

[75] Inventors: Deng-Ke Yang, Hudson; Ruiqing Ma, Kent, both of Ohio

[73] Assignee: Kent State University, Kent, Ohio

[21] Appl. No.: 851,673

[22] Filed: May 6, 1997

Related U.S. Application Data

[63] Continuation-in-part of Ser. No. 694,840, May 2, 1991, abandoned, Ser. No. 885,154, May 18, 1992, Pat. No. 5,384,067, and Ser. No. 425,289, Apr. 20, 1995, Pat. No. 5,691,795.

[51] Int. Cl.$^6$ .............................. G02F 1/13; G02F 1/1335; G02F 1/1333

[52] U.S. Cl. .............................. 349/169; 349/115; 349/88; 349/168

[58] Field of Search .................................... 349/169, 115, 349/88, 168

[56] References Cited

U.S. PATENT DOCUMENTS

| | | |
|---|---|---|
| 3,585,381 | 6/1971 | Hodson et al. . |
| 3,600,060 | 8/1971 | Churchill et al. . |
| 3,620,889 | 11/1971 | Baltzer . |
| 3,650,603 | 3/1972 | Heilmeier et al. . |
| 3,656,909 | 4/1972 | Dixon et al. . |
| 3,680,950 | 8/1972 | Haas et al. . |
| 3,703,331 | 11/1972 | Goldmacher et al. . |
| 3,711,713 | 1/1973 | Wysocki et al. . |
| 3,795,529 | 3/1974 | Cartmell et al. . |

(List continued on next page.)

FOREIGN PATENT DOCUMENTS

| | | |
|---|---|---|
| 0 313 053 | 4/1989 | European Pat. Off. . |
| 0 451 905 | 3/1991 | European Pat. Off. . |
| 0 423 881 | 4/1991 | European Pat. Off. . |
| 63-206724 | 8/1985 | Japan . |
| 1161039 | 8/1969 | United Kingdom . |
| US86/01927 | 3/1987 | WIPO . |

OTHER PUBLICATIONS

Heilmeier et al., *A New Electric Field Controlled Reflective Optical Storage Effect in Mixed Liquid Crystal Systems*, Proc. IEEE, vol. 57, No. 1, pp. 34–38 (1969).

Dir et al., *Cholesteric Liquid Crystal Texture Change Displays*, Proc. SID, vol. 13, pp. 105–113 (Second Quarter 1972).

Hulin, *Parametic Study of the Optical Storage Effect in Mixed Liquid–Crystal Systems*, Appl. Phys. Lett., vol. 21, pp. 455–457 (Nov. 15, 1972).

(List continued on next page.)

*Primary Examiner*—William L. Sikes
*Assistant Examiner*—Kenneth Parker
*Attorney, Agent, or Firm*—Renner, Kenner, Greive, Bobak, Taylor & Weber

[57] ABSTRACT

A new liquid crystalline light modulating cell and material are characterized by liquid crystalline light modulating material of liquid crystal and polymer, the liquid crystal being a chiral nematic liquid crystal having positive dielectric anisotropy and including chiral material in an amount effective to form focal conic and twisted planar textures, the polymer being distributed in phase separated domains in the liquid crystal cell in an amount that stabilizes the focal conic and twisted planar textures in the absence of a field and permits the liquid crystal to change textures upon the application of a field. In one embodiment, the material is light scattering in a field-OFF condition and optically clear in a field-ON condition, while in another embodiment, the material is optically clear in a field-OFF condition and light scattering in a field-ON condition. In still another embodiment, the material exhibits stability at zero field in a colored, light reflecting state, a light scattering state and multiple stable reflecting state therebetween, as well as being optically clear in the presence of a field. This embodiment allows for a display with a substantially white background with substantially black characters much like a printed page. In yet another embodiment, the application of mechanical force to the cell changes the material from an optically clear state to a light reflecting state.

6 Claims, 4 Drawing Sheets

U.S. PATENT DOCUMENTS

| | | |
|---|---|---|
| 3,806,230 | 4/1974 | Haas . |
| 3,816,786 | 6/1974 | Churchill et al. . |
| 3,821,720 | 6/1974 | Greubel et al. . |
| 3,871,904 | 3/1975 | Haas et al. . |
| 3,885,982 | 5/1975 | Fergason et al. . |
| 3,891,307 | 6/1975 | Tsukamoto et al. . |
| 3,947,183 | 3/1976 | Haas . |
| 3,969,264 | 7/1976 | Davis . |
| 4,022,706 | 5/1977 | Davis . |
| 4,070,912 | 1/1978 | McNaughton . |
| 4,077,260 | 3/1978 | Gray et al. . |
| 4,097,127 | 6/1978 | Haas et al. . |
| 4,161,557 | 7/1979 | Suzuki et al. . |
| 4,252,417 | 2/1981 | Scheffer et al.. . |
| 4,408,201 | 10/1983 | Harada . |
| 4,447,132 | 5/1984 | de Zwart . |
| 4,671,618 | 6/1987 | Wu et al. . |
| 4,673,255 | 6/1987 | West et al. . |
| 4,685,771 | 8/1987 | West et al. . |
| 4,688,900 | 8/1987 | Doane et al. . |
| 4,890,902 | 1/1990 | Doane et al. . |
| 4,994,204 | 2/1991 | Doane et al. . |
| 5,082,351 | 1/1992 | Fergason . |
| 5,087,387 | 2/1992 | Mullen et al. . |
| 5,116,528 | 5/1992 | Mullen et al. . |
| 5,138,472 | 8/1992 | Jones et al. . |
| 5,170,271 | 12/1992 | Lackner et al. . |
| 5,172,256 | 12/1992 | Sethofer et al. . |
| 5,251,048 | 10/1993 | Doane et al. . |
| 5,384,067 | 1/1995 | Doane et al. . |
| 5,453,863 | 9/1995 | West et al. . |
| 5,691,795 | 11/1997 | Doane et al. ............................ 349/169 |
| 5,695,682 | 12/1997 | Doane et al. ............................ 349/169 |

OTHER PUBLICATIONS

Greubel et al., *Electric Field Induced Texture Changes in Certain Nematic/Cholesteric Liquid Crystal Mixtures,* Mot. Crys. Liq. Crys., vol. 24, pp. 103–111 (1973).

White et al., *New Absorptive Mode Reflective Liquid–Crystal Display Device,* J. Appl. Phys., vol. 45, pp. 4718–4723 (Nov. 1974).

Gray, *Dyestuffs and Liquid Crystals,* Chimia, vol. 34, pp. 47–(Feb. 1980).

Wysocki et al., *Electric Field Induced Phase Change In Cholesteric Liquid Crystals,* Physical Review Letters, vol. 20, No. 19, pp. 1024–1025 (1968).

Muller, *Effects of Electric Fields On Cholesterol Nananoate Liquid Crystals,* Molecular Crystals, vol. 2, pp. 167–188 (1966).

Harper, *Voltage Effects In Cholesteric Liquid Crystals,* Molecular Crystals, vol. 1, pp. 325–332 (1966).

West, *Phase Separation of Liquid Crystals in Polymers,* Mol. Cryst. Liq. Cryst., vol. 157, pp. 427–441 (Apr. 1988).

Mochizuki et al., *A 1120×768 Pixel Four–Color Double–Layer Liquid–Crystal Projection Display,* Proc. SID, vol. 31, No. 2, p. 15 (1990).

Wysocki, *Electric Field Induces Phase Change In Cholesteric Liquid Crystals,* Research Laboratories, Xerox Corp., pp. 47–65, date unknown.

Gerber, *Voltage Induced Cholesteric Structure Transformation In Thin Layers,* Z Naturforsch, pp. 718–726 (1981).

Hikmet, *Structure of Cholesteric Gels and Their Electrically Induced Light Scattering and Colour Changes,* Liquid Crystals, vol. 12, No. 2, pp. 319–336 (1992).

Hikmet, *Electrically Induced Light Scattering from Anisotropic Gels,* J. Appl. Phys., vol. 68, No. 9, pp. 4406–4412 (Nov. 1, 1990).

Hikmet, *Anisotropic Gels and Plasticized Networks Formed by Liquid Crystal Molecules,* Liquid Crystals, vol. 9, pp. 405–416 (1991).

Wu et al., *Zero Field, Multistable Cholesteric Liquid Crystal Displays,* Submitted for presentation at Workshop on Display Materials (IDRC), date unknown.

Yang et al., *Cholesteric Liquid Crystal/Polymer Gel Dispersion Bistable at Zero Field,* 1991 IEEE, pp. 49–52 (Aug. 1991).

Yang et al., *Cholesteric Liquid Crystal/Polymer Dispersion For Haze Free Shutters,* Appl. Phys. Lett. 60, pp. 3101–3104 (1992).

Doane, *Front–Lit Panel Display From Polymer Stabilized Cholesteric Textures,* Oct. 1992.

Yang et al., *Cholesteric Liquid Crystal/Polymer Gel Dispersion Reflective Display Application,* May 1992.

Doane et al., *Current Trends in Polymer Dispersed Liquid Crystals,* 1991 IEEE, pp. 175–178 (Aug. 1991).

Jiang et al., *Electro–Optics of Multi–Cholesteric Focal Conic Texture with Polymer,* Chem. Express, vol. 6, pp. 1005–1008 (1991).

Aliev, *Three States Of A Cholesteric Liquid Crystal In Micropores,* CA Selects — Liquid Crystals, 12, pp. 1–7 (1985).

Candau et al., *Magnetic Field Effects In Nematic and Cholesteric Droplets Suspended In An Isotropic Liquid,* Mol. Cryst. Liq. Cryst., vol. 23, pp. 283–297 (1973).

POLYMER STABILIZED BLACK-WHITE CHOLESTERIC REFLECTIVE DISPLAY

RELATED APPLICATIONS

This application is a continuation in part of U.S. Ser. No. 07/694,840, filed May 2, 1991, abandoned and incorporated herein by reference, U.S. Ser. No. 07/885,154, filed May 18, 1992, U.S. Pat. No. 5,384,067, incorporated herein by reference, and U.S. Ser. No. 08/425,289, filed Apr. 20, 1995, U.S. Pat. No. 5,691,795, incorporated herein by reference.

GOVERNMENT RIGHTS

The U.S. Government has a paid-up license in this invention and may have the right in limited circumstances to require the patent owner to license others on reasonable terms as provided for by the terms of DARPA/ONR Contract No. N00014-90-J-1559 and NSF Grant No. DMR88-17647.

BACKGROUND OF THE INVENTION

1. Technical Field

The present invention relates generally to liquid crystalline light modulating devices, and more specifically to new phase-separated polymeric-liquid crystalline display cells and materials which exhibit different optical states under different electrical field or mechanical stress conditions and are characterized by a unique combination of properties, including optical multistability and haze-free light transmission at all viewing angles in either a field-ON or field-OFF mode.

2. Description of the Related Art

Electrically switchable liquid crystal-polymer films intended for use in various electro-optical devices have been prepared by mechanical entrapment procedures. One such technique involves imbibing liquid crystal into micropores of a plastic or glass sheet. Another technique involves evaporation of water from an aqueous emulsion of nematic liquid crystal in a solution of water-soluble polymer such as polyvinyl alcohol or in a latex emulsion.

A different procedure offering significant advantages over mechanical entrapment techniques and the emulsification procedure involves phase separation of nematic liquid crystal from a homogeneous solution with a suitable synthetic resin to form a liquid crystal phase dispersed with a polymer phase. The resulting materials are referred to as polymer dispersed liquid crystal (PDLC) films. Some of the advantages of PDLC films are discussed in U.S. Pat. Nos. 4,671,618; 4,673,255; 4,685,771; and 4,788,990; the disclosures of which are incorporated by reference. PDLC films have been shown to be useful in many applications ranging from large area displays and switchable coatings for windows to projection displays and high-definition television.

The methods of phase separation can be carried out by polymerization initiated by addition of a curing agent, by ultraviolet light or by cooling into the region of immiscibility. Another method is evaporating a solvent from a matrix-producing composition of a solution of polymer and liquid crystal in the solvent.

In windows or displays as described above in which the ordinary index of refraction of the liquid crystal is matched to the refractive index of the polymer, the device appears most transparent (field-ON-state) when viewed along the direction of the field which is usually normal to the viewing surface. Transparency decreases giving rise to increasing "haze" at increasing oblique viewing angles until an essentially opaque appearance is detected at an oblique enough angle. This condition of haze results from the fact that the farther the viewing angle is from the orthogonal, the greater is the perceived mismatch between the effective index of refraction of the liquid crystal and the refractive index of the matrix.

A further development of PDLC films disclosed in U.S. patent application Ser. No. 07/324,051, now U.S. Pat. No. 4,994,204, issued Feb. 19, 1991, involves the use of a birefringent polymer, e.g., a liquid crystal polymer. The PDLC film prepared with the birefringent polymer has the characteristic of displaying haze-free transparency for all directions of incident light. This is accomplished by matching the ordinary and extraordinary indices of refraction of the polymer to the ordinary and extraordinary indices of refraction of the liquid crystal.

PDLC films made with birefringent polymer can operate in the normal manner so that they are clear in a field-ON state and light scattering in a field-OFF state. Alternatively, the films can be made to operate in a reverse or "fail-safe" mode such that the material is clear in the absence of a field and is light scattering in the field-ON state.

DISCLOSURE OF THE INVENTION

The invention is an electrically switchable material which exhibits a unique combination of properties that afford significant advantages over preceding technology. For example, the new material can operate either in the mode of being light scattering in a field-OFF condition and clear in a field-ON condition or in the reverse mode of being clear in the field-OFF condition and light scattering in the field-ON condition. In both instances, the material exhibits minimal haze at all viewing angles when in the clear state.

Another important feature of the invention is that the material can be prepared so that it exhibits multiple optically different states, all of which are stable in the absence of an applied field. When incorporated in a display device, the material can be driven from one state to another by an electric field. Depending upon the magnitude and shape of the electric field pulse, the optical state of the material can be changed to a new stable state which reflects any desired intensity of colored light along a continuum of such states, thus providing a stable "grey scale." A low electric field pulse results in a light scattering state which is white in appearance. The application of a sufficiently high electric field pulse, i.e., an electric field high enough to homeotropically align the liquid crystal directors, drives the material to a light reflecting state that can be any desired color. The light scattering and light reflecting states remain stable at zero field. If a sufficiently high electric field is maintained, the material is transparent until the field is removed. When the field is turned off quickly, the material reforms to the light reflecting state and, when the field is turned off slowly, the material reforms to the light scattering state. Electric field pulses of various magnitudes below that necessary to drive the material from the stable reflecting state to the stable scattering state will drive the material to intermediate states that are themselves stable. These multiple stable states indefinitely reflect colored light of an intensity between that reflected by the reflecting and scattering states. Thus, depending upon the magnitude of the electric field pulse the material exhibits stable grey scale reflectivity.

A major advantage of the multistable material is that it does not require an active matrix to make a high-definition flat panel screen. The screen can be prepared without active elements at each pixel site and a multiplexing scheme used to address the display. This greatly simplifies production, increases yield and reduces the cost of the display.

Multiplexed flat panel liquid crystal displays are not new and have been developed primarily with super twisted nematic materials for applications such as lap-top computer screens where speed, contrast or color is not an important issue. Ferroelectric liquid crystals, which exhibit a surface stabilized bistable state, also can be multiplexed. These displays have been difficult to commercialize because the surface stabilization is not maintained under severe operating conditions. The material of the present invention provides several advantages in that the light scattering and light reflecting states are materially stabilized without requiring delicate surface conditions of the substrate. Display devices made with the material of the invention do not require polarizers which limit the brightness of the displays. Furthermore, color is introduced by the material itself without the need of color filters which also can reduce brightness.

The advantageous properties described above are achieved in the invention by providing a light modulating cell comprising a liquid crystalline light modulating material of liquid crystal having positive dielectric anisotropy and including chiral material in an amount effective to form focal conic and twisted planar textures. A polymer is distributed in phase separated domains in the cell in an amount that stabilizes the focal conic and twisted planar textures in the absence of a field and permits the liquid crystal to change textures upon the application of a field.

The addressing means can be of any type known in the art, such as an active matrix, a multiplexing circuit, electrodes, etc. The liquid crystal molecules in the vicinity of the polymer domains are anchored by the polymer. As a result, the new material can be made to exhibit different optical states, i.e., light transmitting, light scattering, light reflecting and stable grey scale in between these states, under different field conditions.

The material used to form the polymer networks is soluble with the chiral nematic liquid crystal and phase separates upon polymerization to form phase separated polymer domains. Suitable polymer materials may be selected from U.V. curable, thermoplastic and thermosetting polymers, including polymers formed from monomers having at least two polymerizable double bonds so as to be cross-linkable, polymethylmethacrylates, bisacrylates, hydroxyfunctionalized polymethacrylates and epoxy systems to name a few. The amount of polymer to be used depends upon the polymer. Useful results have been obtained with polymer contents ranging from about 1.5 to about 40% depending upon the polymer. For pressure sensitive display units it has been found that optimal results are obtained when the polymer content of the liquid crystal material ranges from about 10 to about 20%.

The chiral nematic liquid crystal is a mixture of nematic liquid crystal having positive dielectric anisotropy and chiral material in an amount sufficient to produce a desired pitch length. Suitable nematic liquid crystals and chiral materials are commercially available and would be known to those of ordinary skill in the art in view of this disclosure. The amount of nematic liquid crystal and chiral material will vary depending upon the particular liquid crystal and chiral material used, as well as the desired mode of operation. For normal and reverse mode cells, useful results can be obtained using from 0.5 to about 17% by weight chiral material based on the combined weight of nematic liquid crystal and chiral material and depending upon the chiral material used. A preferred range of chiral material is from about 1 to about 16%. For multistable cells, useful results have been obtained using from about 18 to about 66% by weight chiral material based on the combined weight of chiral material and nematic liquid crystal. For pressure sensitive displays, optimal results have been obtained using from about 32 to about 52% by weight chiral material based on the combined weight of chiral material and nematic liquid crystal.

The wavelength of the light that is reflected by the material is given by the relation $\lambda = np$, where n is the average refractive index and p is the pitch length. Wavelengths above 800 nm are in the infra-red and those below 380 nm are in the ultra violet. In cells which operate in either the normal mode of being light scattering in a field-OFF condition and light transmitting in a field-ON condition or the reverse mode of being light transmitting in the field-OFF condition and light scattering in a field-ON condition, the chiral nematic liquid crystal has a pitch length effective to reflect light outside the visible spectrum, preferably in the infrared spectrum. A preferred pitch length for normal mode and reverse mode cells ranges from about 1.0 to about 4.0 microns. Liquid crystalline light modulating material that operates in the normal and reverse modes have been prepared with chiral nematic liquid crystal containing from about 1 to about 16% by weight, chiral material based on the combined weight of nematic liquid crystal and chiral material. It will be understood that, in both instances, the weight amounts can vary depending upon the particular liquid crystal, chiral material and polymer used.

In carrying out the invention, the solution of liquid crystal and polymer (or polymer precursor) is introduced into a cell. Polymerization is initiated in any suitable manner, as by UV radiation, thermally etc., depending upon the polymer used. Under polymerization conditions, the polymer phase separates from the chiral nematic liquid crystal and forms phase separated polymer domains of polymer molecules.

While not necessary to the invention, in some instances it is preferable to treat the cell walls to provide for surface alignment of the liquid crystal molecules parallel to the cell walls, e.g., by providing the cell walls with rubbed polyamide layers or treating them with detergent or chemicals. This has the effect of improving transmission and response time in some reverse mode cells in the field-OFF condition.

In the case of normal mode cells, polymerization takes place in the presence of an electric field that aligns the liquid crystal molecules orthogonally to the cell walls. When polymerization has been completed and the electric field removed, the liquid crystal molecules in the vicinity of the polymer domains are anchored in a preferential homeotropic alignment. The surrounding chiral liquid crystal has a focal conic texture which results from competition between the forces in the cell, such as any surface effects of the cell walls, the electric field and the constraining effect of the polymer domains. In the field-OFF condition, the polymer-liquid crystalline material is strongly light scattering and the cell is opaque. In the field-ON condition, the focal conic texture reforms to homeotropic alignment so that the cell is optically clear. There is negligible variation or fluctuation of refractive index throughout the liquid crystal molecules and the typically small amount of polymer in the composition. Therefore, the cell is haze-free at all viewing angles. However, it should be noted that increasing the amount of polymer can have the effect of increasing the amount of haze.

In the case of reverse mode cells, polymerization takes place in the absence of a field. The liquid crystal molecules throughout the cell prefer a twisted planar structure. In the absence of a field, the cell is optically clear, since there is no reflecting or scattering in the visible light region. In a field-ON condition, the liquid crystal molecules have a focal conic texture in the presence of the field as a result of competition of the various the electric field and h as any surface effects, the electric field and the constraint of the polymer domains. In this condition, the cell is light scattering. For liquid crystal materials having suitably long pitch lengths, the material will return to the planar texture upon removal of the field.

The multistable color display cells are prepared by polymerizing and phase separating the liquid crystal-polymer solution either in zero field or in a field effective to align the liquid crystal directors. In both instances, the polymer domains that are created in the material serve to stabilize the light scattering state resulting from application of a low electric field pulse and the light reflecting state resulting from application of a high electric field pulse.

In the field-OFF condition with the liquid crystal molecules in a twisted planar texture parallel to the cell walls, the cell is in a colored light reflecting state. This state can be made to appear as green, red, blue, or any pre-selected color depending upon the pitch length of the chiral nematic liquid crystal. When a low electric field, e.g. 6 volts per micron of thickness, is applied to the cell, it will switch to a white, light scattering state. In this state, the liquid crystal molecules surrounding the polymer domains have a focal conic texture as a result of the competition of any surface effects, the electric field and the constraint of the polymer domains. The material will remain in the light scattering state when the low electric field is removed. If a higher electric field, e.g. 12 volts per micron of thickness, is applied to the cell, the material becomes optically clear until the voltage is removed. If the electric field is turned off quickly, the material switches to the uniform twisted planar structure which has the pre-selected color dictated by the pitch length. The light reflecting state remains stable at zero field condition. If the field is turned off slowly, the material changes to its light scattering state which also remains stable at zero field condition. The effect of the polymer domains is to stabilize both the planar and focal conic textures in the zero field condition. The magnitude of the field necessary to drive the material between various states will, of course, vary depending upon the nature and amount of the particular liquid crystal and polymer used, but could be easily determined by one of ordinary skill in the art in view of the instant disclosure.

In the multistable color displays the chiral nematic liquid crystal has a pitch length in a preferred range of from about 0.25 to 0.44 microns effective to reflect circularly polarized colored light. Typical pitch lengths are 0.27 microns for blue color, 0.31 microns for green color and 0.40 microns for red color. Multistable color display materials have been prepared containing from about 27 to about 66% chiral material based on the combined weight of nematic liquid crystal and chiral material. The ranges can vary, however, depending upon the chiral material, liquid crystal and the polymer used.

In one embodiment the multistable display materials can be prepared to function as a bistable light shutter. By adjusting the pitch length of the chiral nematic liquid crystal to reflect light in the ultra violet range, the material will appear clear when switched to the stable planar texture because the reflected light is outside the visible spectrum. As with the color reflecting cells, the material will scatter light when switched to the stable focal conic texture. Hence, the multistable material can be switched between a stable optically clear state, where the liquid crystal reflects light in the ultra violet range, and a stable light scattering state. Pitch lengths effective to reflect light in the ultra violet range will typically be from about 0.5 to about 1 micron. Bistable light shutters that reflect light in the ultra violet, and hence appear clear in the planar texture, and scatter light in the focal conic texture have been prepared containing about 18% by weight chiral material based on the combined weight of chiral material and nematic liquid crystal.

Surprisingly, the multistable color reflecting material exhibits a stable grey scale, i.e., multiple optical states characterized by varying degrees of intensity of reflection, all of which are stable in the absence of an applied field. In between the reflecting and scattering states the material exhibits stable grey scale reflectance of the colored light depending upon the voltage of the electric field addressing pulse. In each case, the electric field pulse is preferably an AC pulse, and more preferably a square AC pulse, since a DC pulse will tend to cause ionic conduction and limit the life of the cell.

In a particular embodiment of the multi-stable color reflecting display, a black-white cholesteric reflective display can be realized by employing a polymer concentration of about three percent based on the combined weight of all the material contained within the cell. A cholesteric material which has an intrinsic pitch of about 600 nm results in a display which appears much like a newspaper or book page. In other words, by selecting in combination the proper polymer concentration and intrinsic pitch of the liquid crystal material, a substantially white page or surface with black characters thereon can be obtained. Accordingly, the black-white cholesteric reflective display provides a pleasing appearance and reduced eyestrain while reading the characters on the display when compared to other currently known liquid crystal reflective displays.

Accordingly, the invention also features a method of addressing a polymer stabilized chiral nematic liquid crystal material capable of being switched between a color reflecting state that reflects a maximum reference intensity, and a light scattering state exhibiting a minimum reference intensity. The method comprises applying voltage pulses of varying magnitude sufficient to achieve stable color reflectivity between said maximum and minimum, thereby producing stable grey scale reflectance from the material.

Preferably the method is characterized by subjecting the material to an AC pulse of sufficient duration and voltage to cause a proportion of said chiral nematic material to exhibit a first optical state and the remaining proportion of the chiral nematic material to exhibit a second optical state that is different than the first state. In the preferred embodiment, the proportion of the material in the first optical state exhibits the planar texture and the remainder of the material in the second optical state exhibits the focal conic texture, the intensity of reflection being proportional to the amount of the material in the planar reflecting texture.

The foregoing and other aspects of the invention which will become apparent as the detailed description proceeds are achieved by a pressure sensitive writing tablet, comprising a liquid crystal material interspersed with polymer and disposed between two opposed substrates; and a surface on at least one of the two opposed substrates for receiving a supplied pressure force for converting the liquid crystal material adjacent thereto from a first optical state to a second optical state.

Many additional features, advantages and a fuller understanding of the invention will be had from the following detailed description of preferred embodiments and the accompanying drawings.

DESCRIPTION OF PREFERRED EMBODIMENTS

Figure 1:
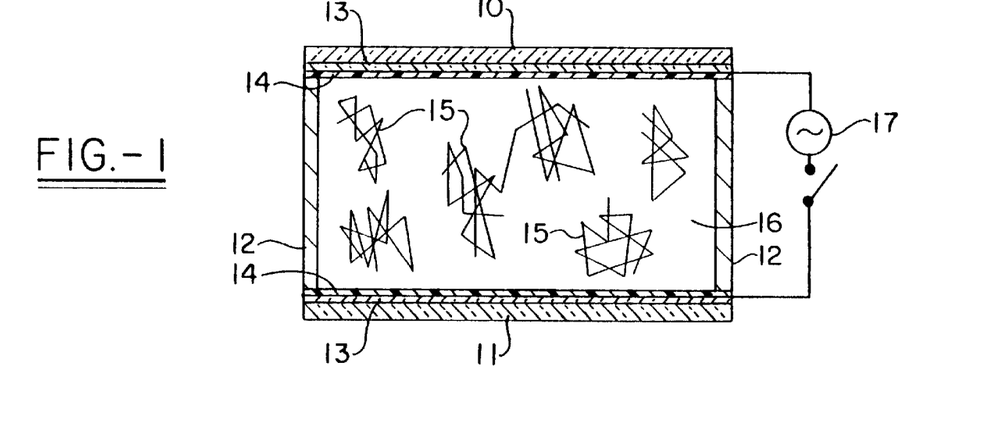
FIG. 1 is a diagrammatic, cross-sectional illustration of a light modulating cell incorporating the polymer-liquid crystalline material of the invention.

The diagrammatically illustrated cell in FIG. 1 comprises glass plates 10 and 11 which are sealed around their edges and separated by spacers 12. As shown, the glass plates 10 and 11 are coated with indium-tin oxide or the like to form transparent electrodes 13. The reference character 14 represents an optional rubbed polyamide coating which can be applied to the electrodes in order to affect homogeneous surface alignment of the liquid crystal directors.

The cell of FIG. 1 is filled with the polymer-liquid crystalline material of the invention. The liquid crystalline light modulating material is generally comprised of phase-separated polymer domains 15 dispersed in surrounding chiral nematic liquid crystal 16 having positive dielectric anisotropy. An AC voltage source 17 is shown connected to the electrodes 13 in order to switch the cell between different optical states.

It is to be understood that the form of the cell depicted in FIG. 1 has been chosen only for the purpose of describing a particular embodiment and function of the liquid crystalline light modulating material of the invention, and that the material can be addressed in various ways and incorporated in other types of cells. For example, instead of being addressed by externally activated electrodes, the new material can be addressed by an active matrix, a multiplexing scheme or other type of circuitry, all of which will be evident to those working in the art. Similarly, the cells can be prepared without the optional alignment layers.

In accordance with the invention, the polymer domains 15 are defined by polymer which is phase separated from a solution with the chiral nematic liquid crystal. The chiral nematic liquid crystal in proximity to the polymer domains 15 is anchored by the polymer.

The polymer content in terms of weight based on the combined weight of chiral nematic liquid crystal and polymer will vary depending upon the polymer used, and is preferably present in an amount ranging from about 1.5 to about 40% by weight based on the combined weight of polymer and liquid crystal. For example, cells have been prepared with a polymer content ranging from about 1.5% to 10% using certain bisacrylates, from about 20 to 30% using certain hydroxy functionalized polymethacrylates, and about 40% when certain % when certain epoxies, thermoplastics and U.V. cured polymers are used. It is to be understood, therefore, that the polymer content is subject to some variation, in as much as what constitutes a desirable or undesirable appearance of the cell in its various optical states is a matter of subjective judgment.

In a preferred manner of preparing the cell shown in FIG. 1, the polymer (or its precursors, e.g. monomers) is dissolved with the chiral nematic liquid crystal together with any necessary photo-initiator, cross-linking or curing agent. The solution is then introduced between the glass plates 10 and 11 shown here having the optional ribbed polyamide coatings 14. The solution is then polymerized in situ to induce concomitant phase separation of the polymer to form the polymer domains in the cell, conceptually illustrated by reference character 15. The polymerization of the polymer-liquid crystal solution can take place either in the presence of an electric field effective to homeotropically align the liquid crystal directors or in a zero field. In the latter case, the liquid crystal molecules will prefer a twisted planar texture oriented parallel to the cell walls.

Normal Mode Cells

Normal mode cells which scatter light in a field-OFF condition and are optically clear in a field-ON condition are prepared using a chiral nematic liquid crystal effective to reflect light outside the visible spectrum, preferably in the infrared spectrum. A preferred pitch length ranges from about 1.0 to about 4.0 microns. Liquid crystalline light modulating materials having the desired pitch length may contain from about 1 to about 16% by weight chiral material based on the combined weight of nematic liquid crystal and chiral material; although, the weight amounts can vary depending upon the particular liquid crystal, chiral material and polymer which are used.

Figure 2:
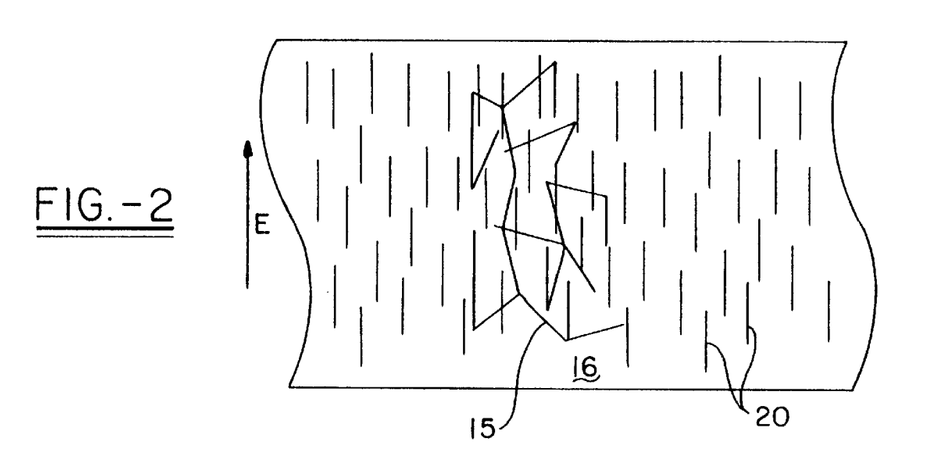
FIG. 2 diagrammatically illustrates the new material when the liquid crystal is homeotropically aligned to affect an optically clear state.

Normal mode cells are prepared by polymerizing the polymer-liquid crystal solution in the presence of an electric field. As shown in FIG. 2, the electric field is effective to untwist the chiral nematic liquid crystal molecules and homeotropically align the liquid crystal directors 20. A single polymer domain 15 is conceptually illustrated in FIG. 2.

Figure 3:
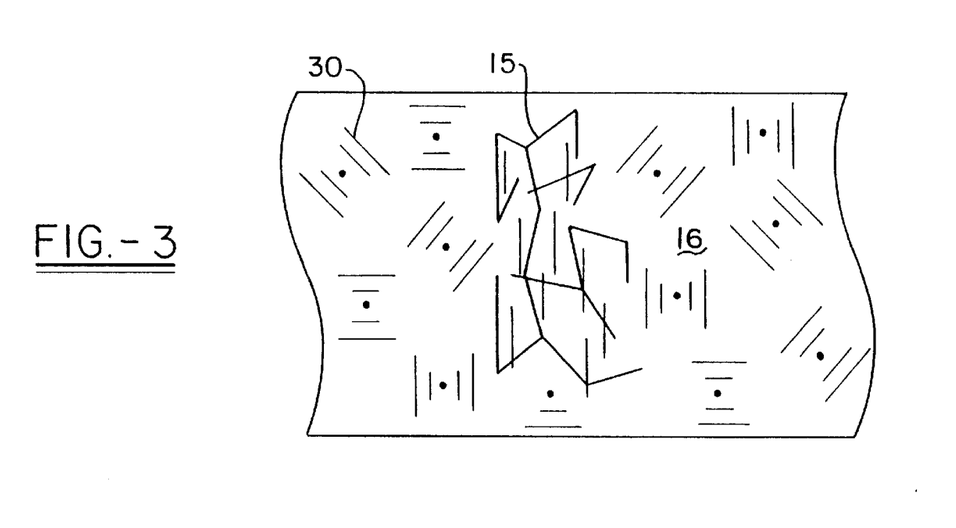
FIG. 3 diagrammatically illustrates the material in a light scattering state wherein the liquid crystal in proximity to the polymer domains is homeotropically aligned, while the surrounding liquid crystal has a focal conic texture.

Each of the polymer domains 15 is believed to be a complex, often cross-linked, three-dimensional network. When the electric field is turned off as illustrated in FIG. 3, the liquid crystal in the vicinity of the polymer tends to remain homeotropically aligned because of the anchoring affect of the polymer. The surrounding liquid crystal indication by reference numeral 30 tends to reform to a focal conic texture, i.e., helically twisted molecules having randomly oriented helical axes. The focal conic texture results from competition between the various forces in the system such as any surface effects and the constraining effect of the polymer domains on the liquid crystal. In the field-OFF condition illustrated in FIG. 3, the polymer-liquid crystalline material is strongly light scattering independent of the polarization of incident light.

When the electric field is turned on to homeotropically align the liquid crystal directors as shown in FIG. 2, the polymer-liquid crystalline material is optically clear. Because of the typically small amount of polymer in the composition, there is no significant variation or fluctuation of a refractive index throughout the liquid crystalline material. Therefore, the cell incorporating the material is haze-free at all viewing angles, although as the amount of polymer is increased the amount of haze may increase.

Reverse Mode Cells

Reverse mode cells which are optically clear in a field-OFF condition and light scattering in a field-ON condition are prepared using a chiral nematic liquid crystal having a pitch length outside the visible spectrum, preferably in the infra-red spectrum. In the case of reverse mode cells, the pitch length varies from about 1.0 to about 4.0 microns. The chiral nematic liquid crystal typically consists of from about 1 to about 66% by weight chiral material based on the combined weight of nematic liquid crystalline chiral material; although, the weight amounts can vary depending upon the particular liquid crystal, chiral material and polymer which are used.

Figure 4:
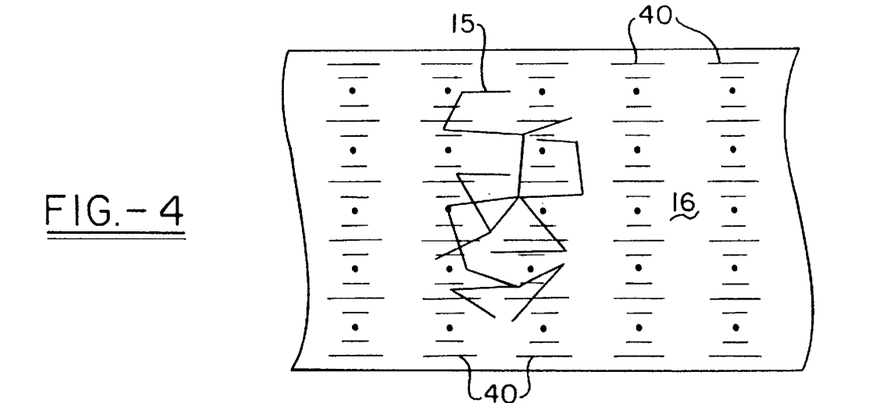
FIG. 4 diagrammatically illustrates the material when the liquid crystal has a twisted planar texture.

Reverse mode cells are made by polymerizing the polymer-liquid crystal solution at zero field. As shown in FIG. 4, the liquid crystal molecules throughout the material prefer a twisted planar texture represented by reference numeral 40. A single polymer domain is again conceptually represented at 15. In the field-OFF condition shown in FIG. 4, a polymer-liquid crystalline material is optically clear, since there is no reflecting or scattering of light in the visible spectrum.

Figure 5:
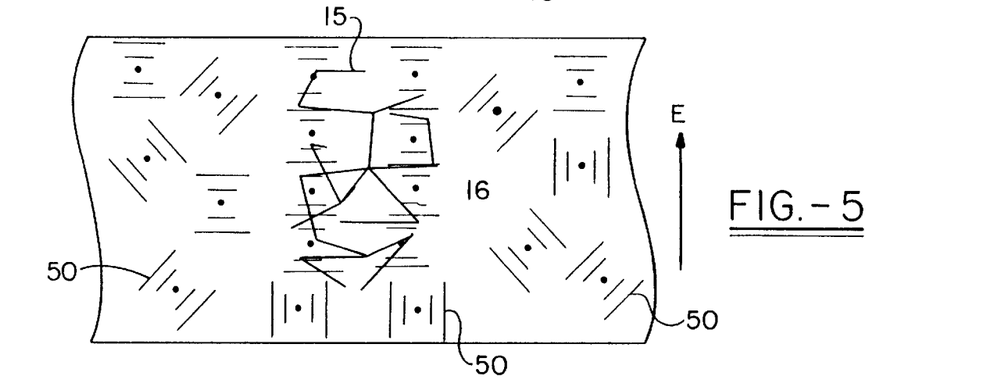
FIG. 5 diagrammatically illustrates the material wherein the liquid crystal in proximity to the polymer domains has a twisted planar structure, while the surrounding liquid crystal has a focal conic texture.

In the field-ON condition conceptually shown in FIG. 5, the liquid crystal molecules in the vicinity of the polymer domains 15 prefer the twisted planar orientation because of the anchoring affect of the polymer domains. The surrounding liquid crystal is reformed by the electric field to a focal conic texture. The focal conic texture in the presence of the field is a result of competition between the forces in the system such as any surface effects, the electric field and the constraint of the polymer domains. In the field-ON condition of FIG. 5, the liquid crystalline-polymer material is strongly light scattering for all polarizations of incident light.

Multistable Color Display Cells

The multistable color display material of the invention exhibits a stable grey scale phenomenon characterized by the ability of the material to reflect indefinitely any selected intensity of light between the intensity reflected by the reflecting state and that reflected by the scattering state. When the material is in the reflecting state, the chiral material assumes a planar texture which reflects colored light at a maximum intensity for a given material, the color of the reflected light being determined by the pitch length of the chiral material. An electric field pulse of an appropriate threshold voltage, typically in the range of about 4 to 5 volts per micrometer of thickness, will cause at least a portion of the material to change its optical state and the intensity of reflectivity to decrease. If the AC pulse is high enough, e.g., in the range of about 6 to 8 volts per micrometer of thickness, the optical state of the material will change completely to the scattering state in which the chiral material exhibits a focal conic texture which reflects light at a minimum intensity for a given material. In between the reflecting state, which for a given material can be considered to define the maximum intensity of reflectivity for that material, and the scattering state, which can be considered to define the minimum intensity of reflectivity, the intensity of reflectivity ranges along a grey scale, which is simply a continuum of intensity values between that exhibited by the reflecting and scattering states. By pulsing the material with an AC pulse of a voltage below that which will convert the material from the reflecting state to the scattering state, or vice versa, one obtains an intensity of reflectivity in this grey scale range.

While not wanting to be bound by theory, it has been observed that the intensity of reflectivity along the grey scale is approximately linearly proportional to the voltage of the pulse. By varying the voltage of the pulse, the intensity of reflectivity of a given color can be varied proportionally. When the electric field is removed, the material will reflect that intensity indefinitely. It is believed that pulses within this grey scale voltage range cause a proportion of the material to convert from the planar texture characteristic of the reflecting state, to the focal conic texture characteristic of the scattering state. Since both the planar texture of the reflecting state and the focal conic texture of the scattering state are stabilized by the polymer in the zero field condition, the grey scale intensities reflected by the display are also stable since the material in these optical states simply comprises a combination of both the stable planar texture and the stable focal conic texture. The intensity of reflectivity along the grey scale is proportional to the amount of chiral material switched from the planar texture to the focal conic texture, or vice versa, which is in turn proportional to the voltage of the AC pulse.

Multistable color display cells which scatter light in one state and reflect circularly polarized colored light in another state with stable grey scale reflection therebetween, and which also can be operated to exhibit optical transparency, are made using chiral nematic liquid crystal which has a pitch length effective to reflect light in the visible spectrum. Preferred materials have a pitch length ranging from about 0.25 to about 0.44 microns. Typical pitch lengths are 0.27 microns for blue color, 0.31 microns for green colors and 0.40 microns for red color. Multistable color display materials have been prepared to contain from about 27 to about 66% chiral material based on the combined weight of nematic liquid crystal and chiral material; although, as in the case of previously described embodiments, the weight amount can vary depending upon the particular chiral material, nematic liquid crystal and polymer which are used.

FIG. 4 conceptually illustrates a single polymer domain 15 of the multistable color display material of the invention in its light reflecting state. In this state, the chiral liquid crystal molecules 40 are oriented in a twisted planar structure parallel to the cell walls. Because of the twisted planar texture the material will reflect light, the color of which depends upon the particular pitch length. In this stable reflecting state, the material exhibits maximum reflectivity that constitutes a maximum reference intensity below which the grey scale intensities are observed.

The planar texture of the liquid crystal in the vicinities of the polymer domains 15 is stabilized by the polymer. The surrounding liquid crystal indicated by reference numeral 50 in FIG. 5, being less stabilized, tends to reform to the focal conic texture when an AC voltage pulse is applied to the cell. As conceptually illustrated in FIG. 5, the multistable color display material is in its light scattering state. In this stable scattering state the material exhibits its minimum intensity of reflection (i.e., maximum scattering) which defines a minimum reference intensity of reflectivity above which the grey scale intensities are observed.

If the pitch length of the polymer stabilized liquid crystal material is in the range effective to reflect visible light, both the light reflecting state of FIG. 4 and the light scattering state of FIG. 5, as well as the grey scale states therebetween, are stable in the absence of an electric field. If the multistable material is in the light reflecting state of FIG. 4 and a low electric field pulse is applied, for example, about 6 volts per micron, the material will be driven to the light scattering state of FIG. 5 and will remain in that state at zero field. If the multistable material is in the light scattering state of FIG. 5 and a higher electric field pulse sufficient to untwist the chiral molecules is applied, e.g., about 10 volts per micron of thickness, the liquid crystal molecules will reform to the light reflecting state of FIG. 4 at the end of the pulse and will remain in that condition. It is to be understood that the voltages per micron necessary to drive the material between optical states may vary depending on the composition of the material, but that the determination of necessary voltages is well within the skill in the art in view of the instant disclosure.

If the pitch length of the liquid crystal material is in the range effective to reflect light in the ultra violet range, a variant of multistable cell can be prepared which functions as a bistable light shutter. When the material is in the stable planar texture the cell appears clear because the light reflected from the cell is outside the visible spectrum. As with the color reflecting cells, the material will scatter light when switched to the stable focal conic texture. Hence, the multistable material can be switched between a stable optically clear state, where the liquid crystal reflects light in the ultra violet range, and a stable light scattering state. Pitch lengths effective to reflect light in the ultra violet range will typically be from about 0.5 to about 1 micron. Bistable light shutters that reflect light in the ultra violet, and hence appear clear in the planar texture, and scatter light in the focal conic texture have been prepared containing about 18% chiral material based on the combined weight of chiral material and nematic liquid crystal.

If the high electric field necessary to untwist the liquid crystal molecules in the multistable color display materials is maintained, the liquid crystal directors will be homeotropically aligned so that the material is transparent. If the field is slowly removed, the liquid crystal orientation will reform to the light scattering state of FIG. 5. When the field is quickly removed, the orientation will reform to the light reflecting state of FIG. 4. The intensities of reflectivity reflected between the reflecting state of FIG. 4 and the scattering state of FIG. 5 are stable grey scale reflectivities. Of course, the intensity value of the reflecting and scattering states may vary as the composition of the material varies, but the grey scale is defined by the range of intensities therebetween.

At voltages less than that which will transform the material from the reflecting state of FIG. 4 to the scattering state of FIG. 5, grey scale states which are themselves stable at zero field are obtained. The reflection from the material in these grey scale states is stable because a proportion of the material is in the planer reflecting texture of FIG. 4 and a proportion of the material is in the focal conic scattering texture of FIG. 5, both of which are stabilized by the polymer in the absence of a field.

Thus, for example, if the material is in the reflecting state of FIG. 4 and an electric field pulse is applied having a voltage insufficient to drive all of the liquid crystal 16 surrounding the polymer domains 15 into the focal conic texture shown at 50 in FIG. 5, i.e., insufficient to drive the material completely to the scattering state, the material will reflect colored light of an intensity that is proportional to the amount of material that remains in the planar reflecting texture. The reflectivity will thus be lower than that reflected from the material when all of the chiral material is in the planar reflecting texture, but still higher than when switched completely to the focal conic scattering texture. As the voltage of the electric field pulse is increased, more of the chiral material is switched from the planar reflecting texture to the scattering focal conic texture and the reflectivity decreases further until the voltage of the pulse is increased to the point where the material is increased still further, the intensity of reflection begins to increase again until the magnitude of the pulse is sufficient to untwist the chiral molecules so that they will again reform to the planar light reflecting texture when the pulse is removed and the material is again in the light reflecting state of FIG. 4.

If the material is in the focal conic scattering state of FIG. 5, an applied electric field pulse will have a negligible effect on the reflectivity of the cell until it reaches a magnitude sufficient to untwist the chiral material, whereby it will reform to the light reflecting state of FIG. 4, as described above, when the field is removed. The grey scale response of a cell as described above is illustrated in FIG. 6 which shows the response of an exemplary material to varying pulse voltages.

One example of a multistable grey scale display cell may be made from a polymer stabilized chiral nematic liquid crystalline material of the following components;

160.7 mg—CB15 cholesteric liquid crystal, BDH Chemicals

160.7 mg—CE2 cholesteric liquid crystal, BDH Chemicals

488.8 mg—E31 nematic liquid crystal, BDH Chemicals

8.0 mg—BAB (4,4'-bisacryloylbiphenyl), lab synthesized monomer     3.0 mg—BME (benzoinmethyl ether), Polyscience Co., photo-initiator     2.2 mg—R4, dichroic dye A mixture of the liquid crystal and monomer was sandwiched between two glass plates with ITO electrodes. The glass plates were polyamide coated and buffed for homogeneous alignment of the liquid crystal. The back plate was painted black and separated from the front plate by 5 $\mu$m glass fibers. In the reflecting state the cell reflected green color. In the scattering state the cell was black. The filled cell was irradiated with U.V. light for thirty minutes to polymerize the monomer and cause phase separation of the polymer into phase separated polymer domains in the cell.

The reflectivity of the cell in response to an AC pulse of varying voltages was measured. In the measurement, square AC pulses having a width of 10 milliseconds (ms) were used. For this material an applied pulse of about 34V switched the cell completely into the scattering state, independent of whether it was in the reflecting state or the scattering state before the pulse. Minimum reflection is observed here. An applied pulse of about 50V switched the cell into the reflecting state independent of whether the cell was in the scattering or reflecting state prior to the pulse. Maximum reflection is observed here. The transformation from the reflecting to the scattering state was near 0.5 ms. The transformation from the scattering to the reflecting state was near 300 ms.

Figure 6:
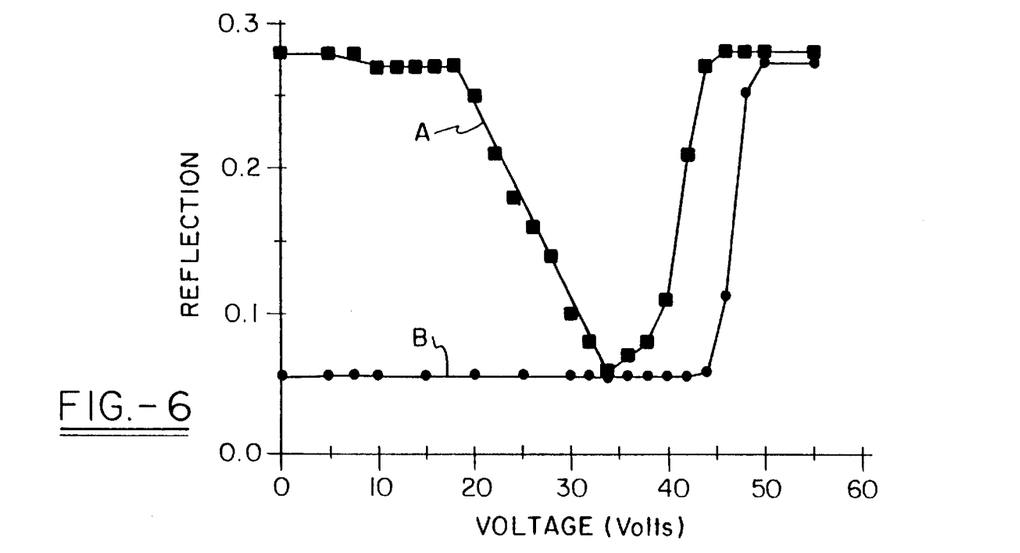
FIG. 6 is a plot of the dynamic response of a cell to AC pulses of varying voltages demonstrating grey scale reflection in the voltage range of about 20 and 34 volts.

The grey scale response of the cell in response to pulses of varying voltage is seen in FIG. 6. Here the voltage of the pulse was varied and the reflection of the cell was measured one second after the pulse. Curve A is the response of the cell when the material is in the reflecting state prior to each pulse. Prior to each pulse platted on Curve A the material was subjected to a high AC pulse of about 50V to ensure that it was completely in the reflecting state prior to the pulse. When the voltage of the pulse is below 20V, the reflection of the cell is not affected. When the voltage of the pulse is between 20V and 34V, the later being the voltage necessary to switch the cell to the scattering state, the reflectivity of the cell decreases approximately linearly as the voltage of the pulse is increased. Grey scale reflectivity is observed in this voltage range. In each case the material continued to reflect after the pulse was removed. When the voltage of the pulse was increased above 34V, the reflectivity of the cell increased until the reflectivity reached its original value, i.e., that of the reflecting state, above 46V. Curve B is the response of the cell when the material was initially in the scattering state prior to the AC pulse. Here the reflectivity of the cell remains unchanged for an AC pulse below 40V. Above 40V the material switches to the reflecting state.

Figure 7:
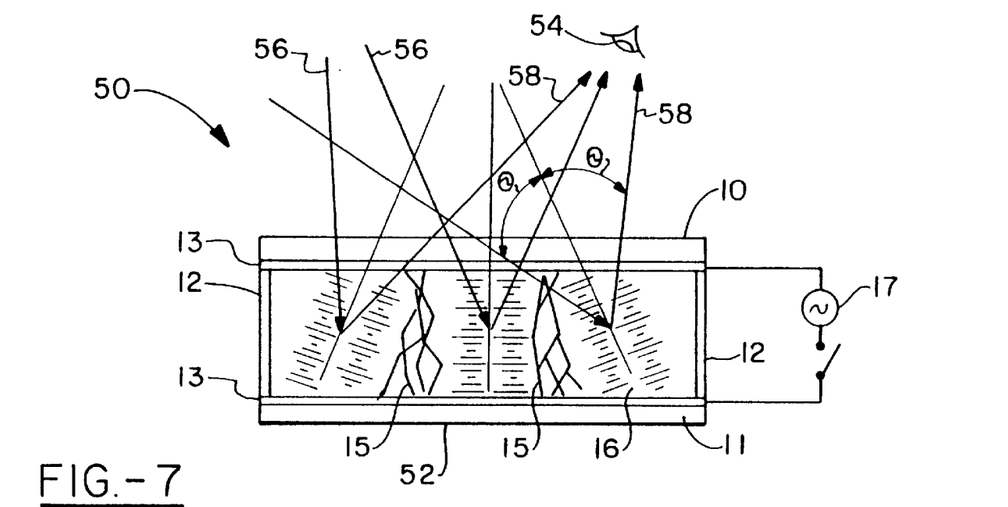
FIG. 7 diagrammatically illustrates a light modulating cell incorporating the polymer-liquid crystalline material which presents a white reflecting appearance according to the present invention.
Figure 8:
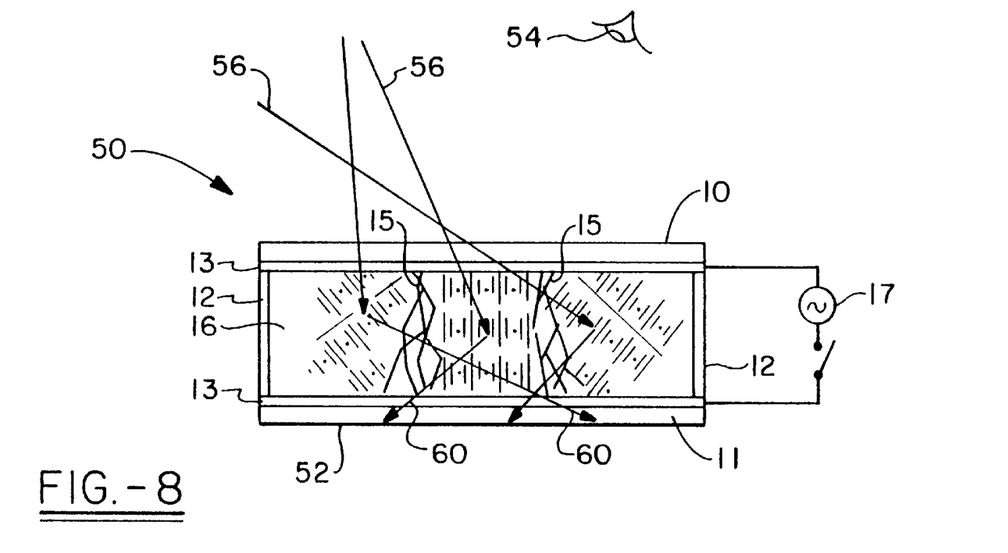
FIG. 8 diagrammatically illustrates a light modulating cell, wherein the liquid crystal material is in a weakly scattering or transmissive state.

Referring now to FIGS. 7 and 8, it can be seen that a polymer stabilized bistable black-white cholesteric reflective display cell according to the present invention is designated generally by the numeral 50. This embodiment incorporates many of the same features as the other bistable cholesteric reflective displays in that it can exhibit two stable states at zero applied electric field. The display 50 includes opposed glass plates 10 and 11, wherein one or both of the plates could be a plastic material which are sealed around their edges and separated by a plurality of spacers 12. The plates 10 and 11 may be coated with indium-tin oxide or the like to form transparent electrodes 13. Additionally, the plates 10 and 11 may be coated or treated to affect homogenous surface alignment of the liquid crystal directors.

The cell 50 is filled with the polymer-liquid crystalline material of the present invention. The liquid crystalline light modulating material is generally comprised of phase-separated polymer domains 15 dispersed in surrounding chiral nematic liquid crystal material 16 having positive dielectric anisotropy. An AC voltage source 17 is connected to the electrodes 13 in order to switch the cell 50 between different optical states.

A color absorption layer 52 is provided on the plate 11 on the side opposite the transparent electrodes 13. Typically, the color absorption layer is black although it could be any other color desired.

As discussed previously, cholesteric liquid crystals exhibit one of two stable states at zero applied electric field. One stable state is the reflecting planar texture and the other stable state is the light scattering focal conic texture. As best seen in FIG. 7, when a cholesteric liquid crystal material 16 is in the planar texture, the helical axes are more or less perpendicular to the cell surface. When a white light, as seen by an eye 54, is incident on the cell 50, as represented by an arrow with the numeral designation 56, colored light is reflected as represented by an arrow with the numeral designation 58. The central or primary wave length of the reflection band is at $\lambda = nP\cos\theta$ and the reflection band width is $\Delta\lambda = \Delta nP$, where P, n and $\Delta n$ are the pitch, average refractive index and birefringence of the liquid crystal material, respectively.

Those skilled in the art will appreciate that the phase-separated polymer domains 15 are established or the monomer is polymerized while the liquid crystal material 16 is in a homeotropic state. In order to obtain at the black-white appearance of the display cell 50, the intrinsic pitch $P_o$ of the cholesteric material 16 is adjusted so that $nP_o$ is around 600 nm (from orange color to red color), where n is the average refractive index of material. $nP_o$ determines the limit of the long wavelength side of the reflection spectrum.

In the present embodiment, a few percent polymer network is dispersed in the liquid crystal material as described above. The polymer concentration is chosen to be about 3%. The polymer concentration should be high enough to cause the helical axes of the planar liquid crystal domains to distribute in a cone of angle around 40°, but be low enough not to cause too much scattering when the liquid crystal is in the weakly scattering focal conic texture. When the domains are in the planar texture, the material has a white appearance, while when the domains are in the focal conic texture, the material has a black appearance or whatever the color of the absorption layer 52 is.

In particular, when the liquid crystal material 16 is in the planar texture, the liquid crystal director configuration is shown schematically in FIG. 7. A predetermined voltage value is applied to the cell 50 and then removed to place the liquid crystal material 16 in the reflecting planar texture. Because of the polymer network 15, the helical axes of the cholesteric liquid crystal in the polymer domains are oriented along various directions around the normal of the cell. Under room light conditions, where light is incident on the cell from all directions, the light reflected from different domains has different colors because the incident angles θ in different domains are different. As such, the light observed by a human eye 54 is an average of the reflection bands centered at different wavelengths, and has a white appearance. Therefore, when a voltage is supplied to the cell 50 to drive the liquid crystal material 16 into the focal conic texture and then removed, the orientation of the helical axes in the domains are essentially parallel to the cell surface as shown in FIG. 8. As such, the incident light 56 is either diffracted or scattered in the forward direction, as indicated by arrows with the numeral designation 60, and absorbed by an absorption layer 52 coupled to the bottom plate 11. Since the absorption layer has a black color, the polymer domains associated with the focal conic texture appear black.

Compared with the high polymer content bistable cholesteric reflective display, this embodiment provides the planar texture with a high reflectance because less volume is occupied by the polymer while the focal conic texture has a lower back scattering and appears black.

EXAMPLE

Nematic liquid crystal E44 (EM): 77.55 wt %
Chiral dopant CB15 (EM): 4.85 wt %
Chiral dopant R1011 (EM): 4.85 wt %
Chiral dopant CE1 (EM): 9.69 wt %
Monomer KS (lab synthesize): 3.00 wt %
Photo-initiator BME (Polyscience): 0.06 wt %

Figure 9:
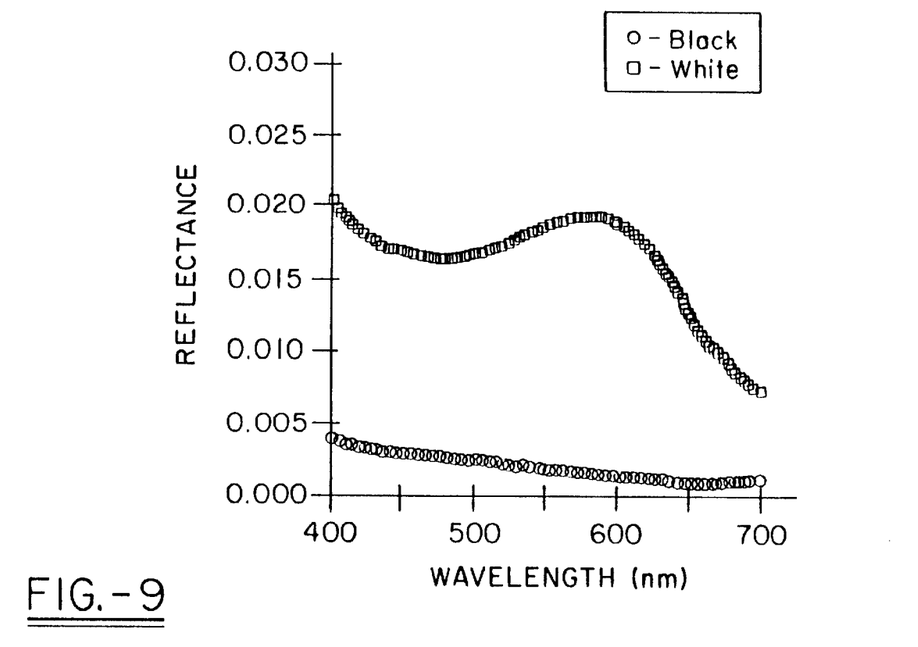
FIG. 9 is a plot of the reflection spectra of the black-white bistable cholesteric display.
Figure 10:
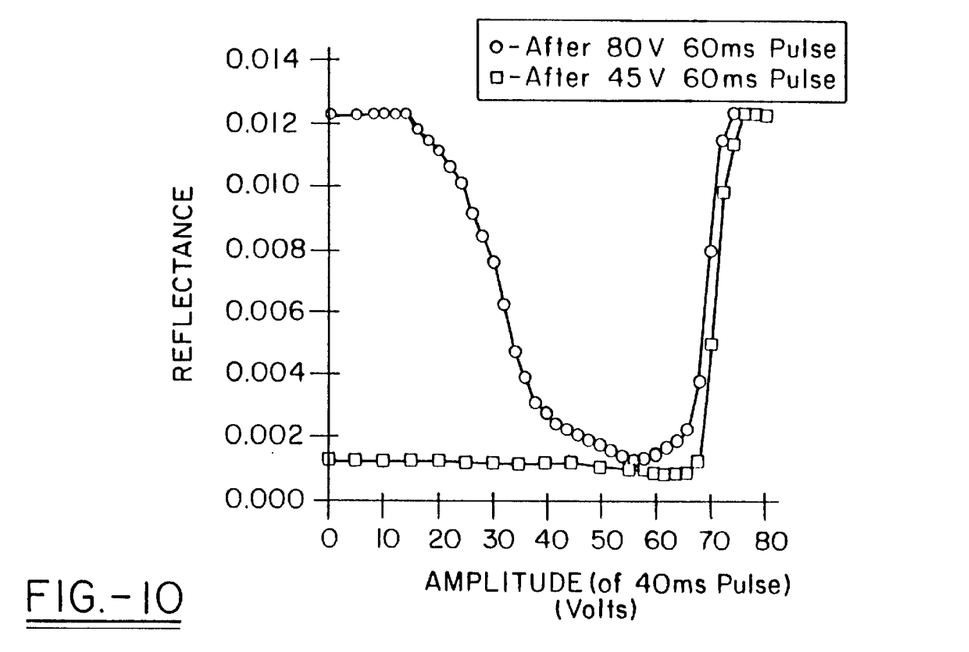
FIG. 10 is a response curve of the black-white bistable cholesteric material to voltage pulses according to the present invention.

The above mixture was filled into a 10 $\mu$m cell in a vacuum oven. The cell was then irradiated by ultraviolet light for photo-polymerization. The reflection spectra of the material in the planar and focal conic textures is displayed in FIG. 9. The response of this material to voltage pulses is shown in FIG. 10. The circle symbol in FIG. 10 represents liquid crystal material that is initially in the planar texture, whereas the square symbols designate the liquid crystal material that is initially in the focal conic texture.

Based on the foregoing, it is apparent that the present embodiment provides a highly contrasting black-white cholesteric display. As such, displays can be manufactured which provide an appearance much like a printed page or newspaper. In other words, a white background with black characters thereon can be provided which has been found to ease eyestrain and provide a pleasing appearance to the reader.

Many modifications and variations of the invention will be apparent to those skilled in the art in light of the foregoing detailed disclosure. Therefore, within the scope of the appended claims, the invention can be practiced otherwise than as specifically shown and described.

What is claimed is:

1. A light modulating reflective cell comprising cell wall structure and a polymer containing chiral nematic liquid crystal light modulating material having positive dielectric anisotropy and a pitch length effective to reflect light in the visible spectrum, said cell wall structure and liquid crystal cooperating to form focal conic and twisted planar textures that are stable in the absence of a field, and means for addressing said liquid crystal material, said means adapted to selectively establish a first voltage pulse of a magnitude effective to transform at least a portion of said liquid crystal from a focal conic texture to a light reflecting twisted planar texture, and a second voltage pulse of a magnitude effective to transform at least a portion of said liquid crystal from a light reflecting twisted planar texture to a focal conic texture, wherein the light reflecting twisted planar texture appears substantially white.

2. The cell according to claim 1, wherein the light reflecting twisted planar texture appears substantially white and wherein the focal conic texture is weakly scattering and appears as the same color as a bottom plate coupled to the cell.

3. The cell according to claim 1, wherein an absorption layer is coupled to the cell and the light reflecting twisted planar texture appears substantially white and the focal conic texture appears substantially black.

4. The cell according to claim 1, wherein the polymer is present in an amount of about 3% based on the total weight of the polymer and liquid crystal in the cell.

5. The cell according to claim 4, wherein the polymer is polymerized while the liquid crystal material is in a homeotropic texture.

6. The cell according to claim 4, wherein the liquid crystal material has an intrinsic pitch of about 600 nm.

* * * * *